United States Patent Office 3,016,365
Patented Jan. 9, 1962

3,016,365
POLYTHIOETHERURETHANE CASTING AND
METHOD OF PREPARING SAME
Hans Holtschmidt, Koln-Stammheim, Germany, assignor, by direct and mesne assignments, of one-half to Farbenfabriken Bayer Aktiengesellschaft, Leverkusen, Germany, a corporation of Germany, and of one-half to Mobay Chemical Company, Pittsburgh, Pa., a corporation of Delaware
No Drawing. Filed Mar. 14, 1957, Ser. No. 645,912
Claims priority, application Germany Mar. 17, 1956
3 Claims. (Cl. 260—77.5)

This invention relates generally to polyurethane plastics and, more particularly, to novel polyurethane plastics and to a method for making the same. Still more particularly, the invention relates to a method for making polyurethane plastics having improved resistance to hydrolytic degradation.

Heretofore, most polyurethane plastics have been prepared by reacting a polyester with an organic polyisocyanate and a cross-linking agent or chain-extender. Methods for making polyurethane plastics from these materials are disclosed, for example, in United States Patents 2,764,565, 2,729,618 and 2,621,166. It has also been proposed to manufacture polyurethane plastics by reacting a polyalkylene ether glycol with an arylene diisocyanate and water. Such processes are disclosed in United States Patents 2,692,873, 2,692,874 and 2,726,219. The polyethers may be the alkoxylation products of polyhydric alcohols or the polymerization products of alkylene oxides, such as, for example, propylene oxide or tetrahydrofuran. For some purposes, polyurethane plastics prepared from the polyalkylene ether glycols have advantages over polyurethane plastics prepared from the polyesters. The polyurethane plastics prepared from the polyalkylene ether glycols are not entirely satisfactory, however, because they are subject to hydrolytic degradation. It has been proposed to correct this hydrophilic characteristic of the polyalkylene ether glycols by using aromatic epoxides, such as, for example, phenoxypropene oxides or cyclohexene oxide, but the product obtained by reacting these materials with a polyisocyanate is too brittle for most purposes.

It is therefore an object of this invention to provide novel polyurethane plastics having improved resistance to hydrolytic degradation. Another object of the invention is to provide novel methods for making polyurethane plastics. Still another object of the invention is to provide polyurethane plastics which are resistant to chemical reagents, especially, those which assert a saponifying influence on the heretofore available polyester products, such as, for example, bases, acids, amines, alcohols, water and the like. A still further object of the invention is to provide polyurethane plastics having improved resistance to hydrolytic degradation which are especially well adapted for making elastic rubber-like objects, cellular plastic objects, lacquers, films, molded objects, adhesives and coatings.

As pointed out in the co-pending application Serial No. 547,304, filed November 16, 1955, by Holtschmidt, Nischk and Kallert, polyurethane plastics having the improved resistance to hydrolytic degradation may be prepared by reacting a polyisocyanate with a polythioether having terminal hydroxyl groups and a molecular weight within the range of from about 800 to about 10,000. As indicated in the aforesaid application, such polythioethers may be prepared by any suitable process, such as, for example, by reacting a polyhydric alcohol with a thioether glycol in a molar ratio of from about 1:1 to about 1:1.5, respectively, at temperatures ranging from about 100° C. to about 300° C. and preferably at a temperature within the range of from about 150° C. to about 250° C. It is preferred to use a dehydration catalyst to accelerate the reaction.

In accordance with the instant invention, the polythioethers which are to be reacted with polyisocyanates to form the advantageous polyurethane plastics may be formed by condensing any suitable polyhydric alcohol or any thioalcohol having any desired number of thioether groups, provided, however, that the polyhydric alcohol or thioalcohol has at least one hydroxyl group in either the beta or gamma position with respect to a sulfur atom. These polyhydric alcohols or thioalcohols containing thioether groups may be condensed with themselves or with other polyhydric alcohols and/or thioalcohols or with thioether alcohols and/or thioether thioalcohols, but in each instance there must be present in at least one of the reactants of the condensation process one hydroxyl group in the beta or gamma position with respect to a sulfur atom. The ratio of the reactants may be varied within wide limits. Best results, however, are to be expected if one hydroxyl group in the beta or gamma position is present for each other OH group contained in the reaction mixture. The molecular weight of the resulting thioether must be at least about 500. A thioether of any molecular weight above 500 is useful for reaction with polyisocyanates. The preferred upper limit of the molecular weight, however, is about 10,000.

It has been found that in addition to the acid esterifying catalysts formerly used in the preparation of polythioethers, the esters of aliphatic and aromatic sulfonic acids may be employed as catalysts in preparing the thioethers. The use of sulfonic acid esters as esterifying catalysts offers the advantage that the polythioethers obtained in their presence are free from traces of acid substances, this being of particular importance in the subsequent reaction of the polythioethers with polyisocyanates.

Examples of polyhydric alcohols which may be used in the production of suitable polythioethers include ethylene glycol, 1,3-butylene glycol, 1,4-butylene glycol, 1,5-amylene glycol, 1,6-hexylene glycol, trimethylol propane, glycerol, hexanetriol, pentaerythritol and mannite. Furthermore, mixed aromatic-aliphatic glycols, such as p-xylylene glycol dihydroxyethyl hydroquinone, dihydroxyethyl-1,5-dihydroxy-naphthalene and the 4,4'-di($\beta$-hydroxyethyl)-ether of 4,4'-dihydroxy-diphenyl-dimethyl methane, may also be used in the present process. Diethylene glycol, triethylene glycol and higher homologues thereof are, on the other hand, less suitable as starting substances, since too many hydrophylic ether-oxygen atoms are introduced by such components into the polythioethers being formed.

Examples of thioether glycols suitable for use in the process of the invention are thiodiglycol, 3,3'-dihydroxypropyl sulfide, and mixed aromatic-aliphatic thioether glycols, such as 1,4-($\beta$-hydroxyethyl)-phenylene dithioether, and also analogous compounds of the naphthalene- and diphenyl-methane series.

An advantageous mode of preparing the polythioethers of the invention involves heating to a temperature of 150° C. to 200° C. a substantially equimolecular mixture of polyhydric alcohol and thioether glycol with the addition of a small amount, preferably 0.1 to 0.5% by weight, based on the weight of the mixture, of a sulfonic acid ester. Water is split off at this temperature, this being completed in about 3 to 6 hours, depending upon the amount of catalyst. By utilizing a vacuum at the end of the reaction, the last residues of the water of reaction are split off and the polycondensation is completed.

The progress of the condensation can be followed by continual determination of the OH number or the viscosity of the melt. By choosing suitable reaction times, which can easily be determined empirically in the manner indicated, it is possible to produce polythioethers of different molecular weights. On the other hand, it is readily possible to form polythioethers of different structures, since linear polythioethers are formed when dihydric alcohols are used as the polyhydric alcohol component, while branched polythioethers are formed when trihydric alcohols or alcohols of higher valency are employed as the polyhydric alcohol component. The degree of branching of the polythioethers may be varied as desired by using mixtures of dihydric and trihydric or tetrahydric alcohols.

Water-repellent thioethers which conform to the requirement of having a beta- or gamma-hydroxyl group with respect to a sulfur atom, are for example, the condensation products of a compound of the following general formula:

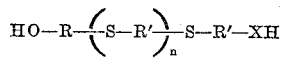

with itself or with other polyhydric alcohols and/or thioalcohols or with thioether alcohols and/or thioether thioalcohols. In this formula, R is a —CH$_2$—CH$_2$— grouping, a —CH$_2$—CH$_2$—CH$_2$— grouping or a —CH$_2$CHR'— grouping; R' is an alkylene, cycloalkylene, arylene or aralkylene radical, the alkyl chain of which can be interrupted by oxygen and may be straight or branched, the terminal OH and/or SH groups may be disposed at the end of a branch; X is oxygen or sulfur; and $n$ is zero or an integer. Compounds of this type are, for example, thioglycols of the following formulae:

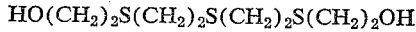
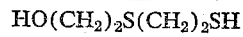

Other polythioethers suitable for reacting with the polyisocyanate to form the improved polyurethane plastics provided by this invention may be prepared from bis-hydroxyalkyl sulfides and a glycol having at least three carbon atoms which has been hydroxyalkylated once or twice. The polyhydroxy compound and the bis-hydroxyalkyl sulfide are preferably reacted together in an approximately 1:1 molar ratio by heating to a temperature of about 100° C. or higher and preferably to a temperature within the range of from about 150° C. to about 200° C. A suitable etherification catalyst is used and, preferably, the reaction vessel is evacuated at least during the later part of the reaction period.

By bis-hydroxyalkyl sulfide as used herein and in the claims is meant a thioether glycol which has only alkyl groups between the hydroxyl group and sulfur atom. Such a compound would have the general formula

wherein R' is an alkylene radical. The thioether glycol may be either a mixed ether or a symmetrical compound. Any suitable thioether glycol having a formula of this nature may be utilized, including, for example, thiodiglycol, 1,7-dihydroxy-4-thiaheptane, β,β'-dihydroxydipropyl sulfide, α,α'-dihydroxydipropyl sulfide, 1,6-dihydroxy-2-thiahexane. Further examples are the compounds of the following formulae:

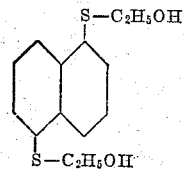

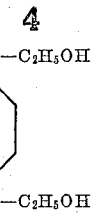

Any glycol produced by alkylating once or twice a glycol having at least three carbon atoms may be utilized. Such glycols have the formula

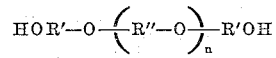

wherein R' is an alkylene radical, R" is a divalent organic radical of at least three carbon atoms, either arylene or aliphatic, and $n$ is 0 or 1. If $n=0$, at least one R' must contain at least three carbon atoms. Preferred examples of such compounds include:

(1) 1,10-dihydroxy-4,8-dioxadecane, $$HO—(CH_2)_2O(CH_2)_4O(CH_2)_2—OH$$

(2) 1,7-dihydroxy-3-oxaheptane, $$HO—(CH_2)_2O(CH_2)_4—OH$$

(3) 1,6-dihydroxy-2-dimethyl-4-oxahexane,

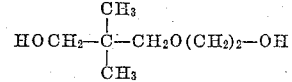

(4) 1,9-dihydroxy-5-dimethyl-3,6-dioxanonane,

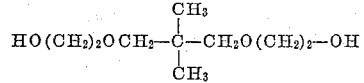

(5) 1,8-dihydroxy-4-methyl-3,6-dioxaoctane,

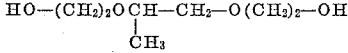

(6) 1,6-dihydroxy-4-methyl-3-oxahexane,

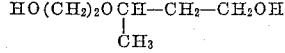

(7) 2,8-dihydroxy-oxaoctane,

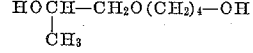

(8) Di-(α-hydroxyethoxy)benzene,

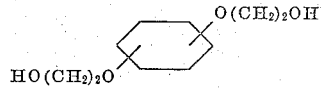

(9) Bis(α-hydroxyethoxyphenyl)methane,

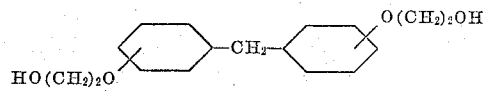

(10) Bis(α-hydroxyethoxyphenyl)dimethylmethane,

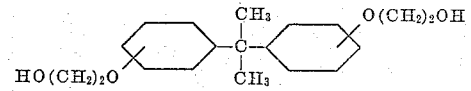

(11) Di(α-hydroxyethoxy)diphenyl,

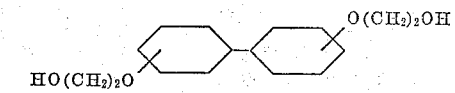

(12) Di(α-hydroxyethoxy)naphthalene,

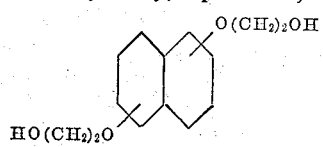

(13) Bis(dihydroxyethoxy)phenyloxide,

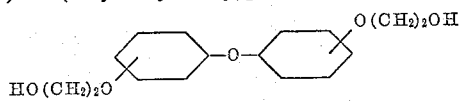

The aromatic rings of these compounds may also carry alkyl groups, halogen atoms or alkoxy groups. These compounds, however, must not contain either a nitro group or a nitrile group.

Any suitable etherification catalyst may be utilized and it is preferably used in smal amounts of from about 0.01 percent to about 0.5 percent by weight. Usually the dehydration is complete after about 6 to 12 hours of heating at temperatures of above 100° C. and preferably within the range of 150° C. to 200° C., but the time of heating may vary somewhat with the amount of catalyst utilized. Evacuation of the vessel in which the condensation process is being conducted towards the end of the reaction insures the removal of the last traces of water from the reaction. Examples of suitable catalysts are aromatic sulfonic acids, esters of aromatic sulfonic acids, sulfuric acid and amidosulfonic acids.

The increase in molecular weight of the condensation product can be followed by determining the hydroxyl number of the melt as the condensation process progresses. A molecular weight of from about 500 to about 10,000 is preferred. The product has terminal hydroxyl groups and units of the configuration

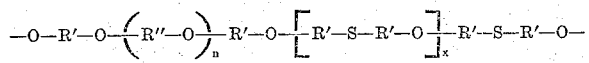

wherein $n$ is either 0 or 1, $R'$ is an alkylene radical and when $n=0$, $R'$ is an alkylene radical containing at least three carbon atoms, $R''$ is a divalent organic radical containing at least three carbon atoms, and $x$ is 0 or an integer.

Polythioethers prepared from bis-hydroxyalkyl sulfides and a glycol having at least three carbon atoms which has been hydroxyalkylated once or twice with varying degrees of branching may be obtained by adding a trihydric alcohol or other polyhydric alcohol having more than two hydroxyl groups to the reaction mixture of bis-hydroxyalkyl sulfide and glycol. Usually such polyhydric alcohols are utilized in relatively low proportions unless a large amount of branching of the chain is desired. The invention also contemplates a process in which linear or branched polyesters containing hydroxyl groups and having a molecular weight of approximately 500 to 6,000 are used in addition to the hydroxyalkylated glycols to form the condensation product. In this process, however, it is preferred to heat the mixture of the glycol and the bis-hydroxyalkyl sulfide until a condensation product having a molecular weight of about 400 or more is obtained before adding the polyester to the reaction mixture. It has been found that if this precaution is taken the polyester will mix with the polyether, whereas a polyester and polyether of less than 400 molecular weight are not usually miscible with each other.

The invention also contemplates reacting a polyisocyanate with a polyether formed by condensing a glycol having both sulfur-ether bridges and oxygen-ether bridges with itself or with a glycol containing as ether bridges only sulfur-ether bridges. In the condensation of the two unlike glycols, it is preferred to use a molar ratio of about 1:1 or a greater proportion of the non-hydroxy-alkylated glycol in order to obtain a product having the optimum of sulfur-ether bridges.

Any suitable hydroxyalkylated thioether glycol may be utilized as the one component, but it is preferred to use a glycol containing aliphatic groups and particularly ethylene, propylene or isopropylene groups bonded between the sulfur-ether bridges and a terminal hydroxyl group. Examples of such compounds include bis-β-hydroxyethyl sulfide, β,β′-dihydroxydipropyl sulfide and α,α′-dihydroxydipropyl sulfide. It is also possible to use organic compounds containing aromatic radicals, but such compounds should preferably contain one of the alkylene radicals between the sulfur-ether bridge and the terminal hydroxyl group. Examples of such compounds are

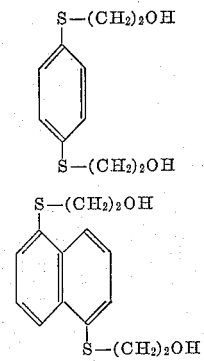

These compounds contain two sulfur bridges and are particularly advantageous because they produce a product having a large number of the desirable sulfur bridges. It is also possible to use aliphatic compounds having more than one sulfur bridge, such as, for example, $$HO-(CH_2)_2-S-(CH_2)_4-S-(CH_2)_2-OH$$

Any suitable hydroxyalkylated thioether glycol may be utilized, but it is preferred to use a glycol which has been produced by reacting one of the aforesaid thioether glycols with one or more mols of an alkylene oxide. Any suitable alkylene oxide, including cycloaliphatic alkylene oxides, may be used. For example, ethylene oxide, propylene oxide, cyclohexene oxide, trimethylene oxide and styryl oxide may be used to advantage.

A glycol containing thioether groups can be hydroxyalkylated without using pressure by heating the reaction mixture to a temperature of above about 80° C. and using from about 0.1% to 10% and preferably from about 0.3% to about 0.5% of a strongly basic tertiary amine or quaternary ammonium base as a catalyst. The invention thus provides a process having advantages over the prior art processes in which glycols in a caustic alkaline medium are heated to elevated temperatures and under pressure. If pressure is not utilized in the prior art process, the reaction stops at bis-β-hydroxyethyl sulfide when ethylene oxide is reacted with hydrogen sulfide and the use of such catalysts as p-toluene sulfonic acid or ferric chloride will not result in the production of compounds of high molecular weight. However, in accordance with the process of this invention, it is possible for one or any desired number of molecules of an alkylene oxide to be added to the glycol containing thioether groups and the reaction proceeds at a rapid rate. Any suitable basic tertiary or quaternary ammonium base may be utilized as the catalyst. Preferred examples include hexahydrodimethylaniline, N-alkylmorpholines, tributyl amine, pentamethyltriethylene tetramine and tribenzylammonium hydroxide.

Thioether glycols containing several added mols of an alkylene oxide per mol of glycol containing a thioether group may be utilized in practicing the invention, but it has been found that those compounds to which only one mol of an alkylene oxide is added per mol of glycol containing thioether groups and which contain an

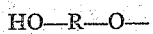

group in either the beta or alpha position to the sulfur atom are of particular importance. R in the above formula must be a group of at least two carbon atoms. The addition product of one mol of ethylene oxide or of 1,2-propylene oxide with one mol of bis-β-hydroxyethyl sulfide has been found to be particularly advantageous. The non-hydroxyalkylated thioether glycol used in practicing the invention may be the same as those used for reacting with the alkylene oxide or it may be a thioether glycol in which the thioether group is connected to the hydroxyl groups by alkylene groups of relatively high molecular weight. An example of such a compound is 4,4′-dihydroxydibutyl sulfide.

The polycondensation process can be carried out by heating a substantially equimolecular mixture of the two components, with the addition of a small proportion, preferably 0.1% to 5%, of an etherification catalyst, to a temperature higher than 100° C., preferably 150° C. to 250° C. Depending on the proportion of catalyst, the splitting off of water is complete in from about 6 to about 12 hours. By evacuating the reaction vessel at the end of the reaction, the last traces of the water of reaction can be split off and the polycondensation can be completed. Any suitable catalyst may be utilized, including, for example, aromatic sulfonic acids and their esters, sulfuric acid and amidosulfonic acid. The progress of the condensation can be followed by constantly determining the OH number or the melt viscosity. In this way, it is possible for the molecular weight of the products to be varied as required.

It is also possible for small proportions of trihydric alcohols or alcohols with more than three hydroxy groups in the molecule to be concurrently used in the polycondensation. In this way, it is possible to obtain polyethers of varying structure and with varying degrees of branching. This process permits the production of polythioethers of sufficiently high molecular weight with practically a quantitative yield. Moreover, such a process makes it possible to produce polythioethers with a high sulfur content adapted for making plastics of improved water repellency characteristics in a simple and economical manner.

In carrying out the above condensation reactions to produce polythioethers suitable for use in the process of the invention, there may be used all conventional etherification catalysts, such as organic and inorganic acids, and salts. In many cases, particularly good results are obtained if the condensation is effected in the presence of an organic sulfonic acid ester, phosphoric acid, potassium phosphate or phosphoric acid esters and other derivatives.

It is to be noted that any suitable thioether glycol may be used for preparing the polythioether glycol provided that at least one of the reactants for the polycondensation process has at least one hydroxyl group in a beta or gamma position with respect to at least one sulfur-ether bridge in the chain. It is preferred to have about one OH group in a beta or gamma position with respect to a sulfur atom present for each other OH group in the starting mixture. The many examples listed in the foregoing are exemplary of the type of compound contemplated.

The polythioethers having sulfur-ether and oxygen-ether bridges and terminal hydroxyl and sulfhydryl groups, which are obtainable by the above-described and similar methods, may be reacted individually or in mixtures with polyesters or polyalkylene ether glycols with any suitable polyisocyanate to form the polyurethane products of the instant invention. Examples of polyisocyanates are tetramethylene diisocyanate, hexamethylene diisocyanate and also 1,4-cyclohexyl diisocyanate. From the aromatic series, there are to be mentioned 1,2,4- and 1,2,6-toluylene diisocyanates and their technical mixtures, p-phenylene diisocyanate, p,p′-diphenylmethane diisocyanate, 1,5-naphthylene diisocyanate, triphenylmethane-4,4′,4″-triisocyanate and the reaction products of polyvalent alcohols with an excess of diisocyanates, for example, the reaction product of 1 mol of trimethylol propane and 3 mols of toluylene diisocyanate. Urethdione diisocyanates (dimeric diisocyanates) and masked polyisocyanates which only liberate their isocyanate groups under heat can, of course, also be reacted with the polythioethers.

High-grade elastomeric substances are obtained, for example, by reacting straight-chained polythioethers with an amount of a diisocyanate in excess of that necessary for a pure linear lengthening of the chain and then producing cross-linking by adding a glycol, a diamine, water or the like. It is possible for shaping to take place immediately or at a later stage. However, it is also possible for a straight-chained polythioether to be reacted with an excess of a diisocyanate, the result in this case being an isocyanate-modified polythioether with free isocyanate groups, which is reacted with a diamine, glycol and/or aminoalcohol in such an amount that a storable intermediate product having free amino or hydroxyl groups is formed. The storable intermediate product can then be transformed into an elastomeric material in a second stage by reaction with a further quantity of a diisocyanate.

In the manufacture of foamed or cellular materials, linear or branched thioethers are chosen as reactants and these are reacted, preferably with addition of accelerators and emulsifiers, or polyisocyanates and water while stirring vigorously, cross-linking and foam formation taking place. Whereas substantially linear polythioethers having an hydroxyl number below 150 will react with polyisocyanates to form elastic foams, rigid foams are obtained if a polyisocyanate is reacted with a branched polythioether having an hydroxyl number above 150.

The concurrent use of an organic base which contains at least one tertiary nitrogen atom and at least two groups capable of reacting with isocyanates has proved to be particularly advantageous when manufacturing foamed materials. It is expedient to proceed in such manner that the polythioether and the organic base are initially reacted with an amount of a polyisocyanate less than that calculated on the basis of the functional groups present, the reaction product being foamed in a second stage with excess polyisocyanate and water. However, it is also possible for the polythioether and the said organic base to be reacted immediately with an amount of polyisocyanate in excess of that calculated on the functional groups present and for the foaming to be carried out after adding water.

As tertiary bases having functional groups which are capable of reacting with isocyanates, there are advantageously used compounds of the following formulae:

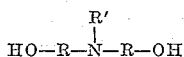

in which R is an alkylene group, such as, for example, ethylene or propylene. R′ can be an alkyl group, such as methyl, ethyl, a cycloalkyl group, such as, for example, cyclohexyl or even a radical with a further functional group, such as, for example, hydroxyethyl. Examples of suitable compounds are methyl diethanolamine, triethanolamine and dihydroxyethyl cyclohexylamine. It is also possible to use compounds having several tertiary amino groups, such as, for example, the hydroxyethylation product of diethylene triamine or triethylenetetramine. The bases can be incorporated in an amount of 0.05 to 10% by weight, based on the polyether.

The amount of water used for the foaming is from about 0.5% to about 5% by weight and preferably 0.5% to about 3% by weight, based on polythioether. It is, in addition, also possible to use emulsifiers (0.5% to 10%), such as, for example, amine salts of the fatty acids, and accelerators (0.1% to 5%), such as those used in known manner when reacting isocyanates with compounds containing active hydrogen, such as, for example, hexahydrodimethyl aniline or the adipic acid ester of N-dimethyl ethanolamine, sodium phenolate or iron acetonylacetane.

Two-dimensional formations, for example, lacquer coatings, films, impregnations, adhesive and coating layers are obtained if, for example, predominantly branched polythioethers are dissolved with a diisocyanate or polyisocyanate or a substance splitting off diisocyanate or polyisocyanate in a solvent and the solution is later applied to a support, for example, a metal sheet, a fabric, wood or paper, polyaddition and cross-linking taking place after evaporation of the solvent in the cold or by heating. Finally, molding compounds can be obtained if polythioethers are mixed substantially in molar ratio of the reactive hydroxyl groups with diisocyanates or polyisocyanates, relatively large amounts of suitable fillers, such as sawdust, chalk, carbon black, iron oxide or colloidal silica, are added and the polyaddition and cross-linking are allowed to proceed under pressure at elevated temperature.

It is to be noted that the polythioethers are compatible with polyesters which have terminal OH and/or COOH groups, so mixtures of polythioethers and polyesters can be used in any desired proportions for the manufacture of polyurethane plastics according to the present invention.

With the elastomeric substances, foamed materials, lacquers, coating layers, foils and impregnations manufactured according to the invention, the resistance to chemical agents and especially to those which exert a saponifying influence in the polyester products, such as bases, acids, amines, alcohols and water or steam, is extraordinarily high. Aqueous caustic soda solution, dilute sulfuric acid, oils with special additives, such as emulsifiers, high pressure additives and other substances which are known to destroy the corresponding polyester products after a short time, do not have any appreciable influence on the properties of the products prepared from the polythioethers, even at elevated temperatures. It is only the action of alcoholic alkali solution under the influence of heat which causes destruction after a relatively long time by attacking the urethane bond.

The physical properties of the plastics obtained are shown in the following paragraph:

The mechanical properties of the foamed materials are about 30% to 50% better than those of the corresponding product with a polyester base. The elasticity is about 10% to 20% higher and the setting temperature about 20% lower. As regards the elastomeric materials, there is to be particularly emphasized the higher elasticity with the same breaking elongation and the same permanent elongation. The shore hardness can be adjusted to range from 60 to 96.

The products of high molecular weight which have been hereinbefore described show a considerable proportion of sulfur, so that certain very desirable properties based on the water-repellent effect of the sulfur atoms become apparent.

*Example 1*

About 1040 grams of the glycol of the formula

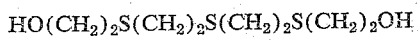

are condensed at about 160° C. with about 1518 grams of butanedihydroxyethyl glycol

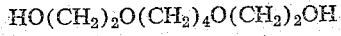

with the addition of about 8 grams of p-toluene sulfonic acid, to an OH number of 106. The yield is about 2187 grams.

About 2187 grams of this polythioether are mixed with about 24.8 grams of N-methyl diethanolamine and thereafter about 210 grams of toluylene diisocyanate are added dropwise at about 80° C. to about 90° C. The OH number of the modified polythioether is 50.5.

About 200 grams of this modified polythioether are mixed with an activator mixture consisting of about 6 grams of adipic acid ester of N-diethyl-ethanolamine, about 3 grams of diethylammonium oleate and about 2 grams of castor oil sulfate. This mixture has added thereto about 4 grams of water and about 73 grams of an isomer mixture consisting of about 70 parts by weight of 1,2,4-toluylene diisocyanate and about 30 parts by weight of 1,2,6-toluylene diisocyanate and thoroughly mixed with a high speed stirrer. A highly elastic foam is formed which hardens after a short time and has the following mechanical properties:

Unit weight _____ 52 kg./m.$^3$.
Elasticity _____ 25%.
Notch impact strength _____ 1.15 kg./cm.$^2$.
Elongation _____ 206%.

*Example 2*

About 1660 parts of monohydroxyethyl thiodiglycol $HO(CH_2)_2O(CH_2)_2S(CH_2)_2OH$ are condensed to an hydroxyl number of 56 by addition of about 0.3% of p-toluene sulfonic acid at about 150° C. to about 160° C.

About 500 grams of the polythioether thus obtained are mixed while stirring at about 120° C. with about 95 grams of 1,5-naphthylene diisocyanate. After about 7 minutes, the reaction is completed and after about 10 grams of 1,4-butylene glycol have been incorporated by stirring, the mixture can be poured into waxed molds heated to about 110° C.

The elements removed from the mold after about 30 minutes show the following mechanical properties after having been finally heated for about another 24 hours at about 110° C.:

Tensile strength _____ 160 kg./cm.$^3$.
Breaking elongation _____ 585%.
Permanent elongation _____ 18%.
Load at 20% elongation _____ 14%.
Load at 300% elongation _____ 75 kg./cm.$^2$.
Ring test strength _____ 18.
Shore hardness _____ 84.

*Example 3*

About 122 parts of thiodiglycol are heated with about 118 parts of 1,6-hexanediol upon addition of about 0.5% of p-toluene sulfonic acid methyl ester. Water is split off in a violent reaction at about 160° C. to about 170° C. After a reaction period of about 3 to 4 hours the OH number is 110. By further condensation in water jet vacuum the OH number is lowered to 58, which takes about 1 to 2 hours. When the condensation is complete, superheated steam is blown through the reaction mass for about 30 minutes at about 150° C. After being dried in vacuo, the prepared polyether constitutes a wax-like brownish mass which melts at about 35° C. to about 40° C. and which is soluble in the conventional organic solvents, such as chloroform, benzene, acetone, etc. The product is completely insoluble in water.

About 500 grams of this polyether are mixed by stirring at about 120° C. with about 95 grams of 1,5-naphthylene diisocyanate. The reaction is complete after about 8 minutes and the thinly viscous material which is obtained is stirred with about 10 grams of a mixture consisting of about 10 parts of 1,4 butylene glycol and about 3 parts of trimethylol propane and poured into waxed molds heated to about 110° C. The rubber-like moldings can be removed after about half an hour.

After about 6 months in water at a temperature of about 110° C. the material described does not show any damage. A corresponding material made of a polyester is destroyed after about 15 days under these conditions.

*Example 4*

About 122 parts of thiodiglycol are initially stirred for about 4 hours at about 110° C. with about 90 parts of 1,4-butanediol and about 0.5% of p-toluene sulfonic acid methyl ester, the temperature thereafter being raised to about 160° C. At this temperature most of the water is split off. After about 5 hours, a water-jet vacuum is applied and by continuously taking samples, the degree of etherification is determined by reference to the OH numbers. The condensation is stopped when the OH number is 56. The catalysts can be destroyed by methanolic caustic soda solution or ammonia. The product is a yellowish-brown viscous oil having the same properties as regards solubility as the product of Example 3.

About 90 grams of 1,5-naphthylene diisocyanate are mixed by stirring at about 126° C. with about 500 grams of this polyether. After about 7 minutes, the reaction is complete and after mixing about 10 grams of 1,4-butylene glycol therewith by stirring, the mixture can be poured into waxed molds heated to about 110° C. The rubber-like elements removed from the mold after about 30 minutes show the following test values after being finally heated for about 24 hours at about 110° C.

| | |
|---|---|
| Tensile strength | 130 kg./cm.² |
| Breaking elongation | 600%. |
| Permanent elongation | 24%. |
| Loading at 20% elongation | 13 kg./cm.² |
| Loading at 300% elongation | 75 kg./cm.² |
| Ring structure | 15. |
| Elasticity | 59. |
| Shore hardness | 84. |

No deterioration in the physical properties is observed after keeping the product for about 14 days in about 5% sulfuric acid and also in about 7% caustic soda solution at about 90° C. Under the same conditions, an elastic plastic derived from a polyester is completely decomposed in about 3 days.

*Example 5*

About 122 grams of thiodiglycol are condensed according to Example 3 with about 62 parts of glycol and about 0.25% of p-toluene sulfonic acid methyl ester. The condensation is stopped at an OH number of 63. The polyether is a light-yellow viscous oil and is also of hydrophobic character.

About 190 grams of 1,5-naphthylene diisocyanate are mixed by stirring with the about 1000 grams of this polyether at about 124° C. The reaction is complete after about 9 minutes. After stirring in about 21 grams of 1,4-butylene glycol, the mixture is poured into waxed molds heated to about 110° C. The rubber-like moldings can be removed from the mold after about 35 minutes and show the following values after having been heated for about 24 hours more at about 110° C.:

| | |
|---|---|
| Tensile strength | 140 kg./cm.³ |
| Breaking elongation | 700%. |
| Permanent elongation | 28%. |
| Loading at 20% elongation | 11 kg./cm.² |
| Loading at 300% elongation | 69 kg./cm.² |
| Ring structure | 17 kg. |
| Elasticity | 62%. |
| Shore hardness | 87. |

No deterioration of the physical properties is observed after this material has been stored for about 60 days at about 95° C. in a gear oil which contains a high pressure additive. An elastic material consisting of diisocyanates and polyesters and prepared by the same method is strongly damaged after being in this oil for about 7 days.

*Example 6*

About 200 grams of the polyether according to Example 3 are mixed with about 300 grams of a polyester having terminal OH groups (OH number: 54) and prepared by thermal esterification of adipic acid and ethylene glycol. This mixture is stirred at about 125° C. with about 92 grams of 1,5-naphthylene diisocyanate. The reaction is terminated after about 10 minutes. Upon addition of about 10 grams of 1,4-butylene glycol, the mass is poured into waxed molds heated to about 110° C. The removal from the molds can take place after about 35 minutes. The final heating lasts about 24 hours.

After the material thus obtained has been kept for about 3 months in water at a temperature of about 100° C., only a slight deterioration of the physical properties is observed. An elastic plastic made from diisocyanate and polyester is completely destroyed after about 3 weeks under these conditions.

*Example 7*

In order to produce an elastic foamed product, about 100 grams of the polyether prepared from thiodiglycol and 1,4-butylene glycol as described in Example 4 and having the OH number 74 are mixed with about 3 grams of an accelerator (adipic acid ester of N-diethylethanolamine), about 2 grams of an emulsifier (diethylamine oleate) and about 1.5 grams of water. About 29 grams of an isomer mixture containing about 70 parts of 1,2,4-toluylene diisocyanate and about 30 parts of 1,2,6-toluylene diisocyanate are added to this mixture and thoroughly mixed by means of a high-speed stirrer. A highly elastic foam is formed which is cured after a short time and has the following physical properties:

| | |
|---|---|
| Bulk weight | 73 kg./m.³ |
| Elasticity | 34%. |
| Tearing strength | 1.13 kg./cm.² |
| Breaking elongation | 199%. |

The saponification number of this foam (saponification with alcoholic KOH) is 30, while it is of the order of 350 to 400 with a corresponding foam built up of polyesters. The resistance to saponifying influences is the same as with the products described in Examples 3, 4, 5 and 6. The product is also not changed after being kept in 3% $H_2O_2$ solution.

*Example 8*

About 100 grams of a polyether prepared as described in Example 3, OH number 120, are mixed with about 1 gram of hexahydrodimethyl aniline and about 2 grams of diethylamine oleate. After adding about 1 gram of water and about 33 grams of the isomer mixture of toluylene diisocyanate (see Example 7), the foaming process is initiated by vigorous stirring. The elastic foam obtained has the following physical values:

| | |
|---|---|
| Bulk weight | 102 kg./m.³ |
| Elasticity | 32%. |
| Tearing strength | 1.65 kg./cm. |

After being boiled, the tearing strength dropped only by a very small amount and was 1.45 kg./cm. The saponification number was 66.

*Example 9*

About 100 grams of the polyether of Example 5 and about 100 grams of a weakly branched polyester, prepared by thermal esterification of about 1 mol of adipic acid, about 1 mol of diethylene glycol and about ½₇ mol of trimethylol propane, with the OH number 60, are mixed with about 6 grams of hexahydrodimethyl aniline and about 4 grams of diethylamine oleate. The foaming process is initiated by adding about 3 grams of water and about 56 grams of a toluylene diisocyanate isomer mixture (see Example 7). The elastic foam has the following values:

| | |
|---|---|
| Bulk weight | 73 kg./m.³ |
| Breaking elongation | 156%. |
| Elasticity | 25%. |
| Tearing strength | 0.63 kg./cm. |

The saponification number is 180. The product has a considerably higher resistance to saponification than the pure polyester foam.

*Example 10*

In order to produce a rigid foam, about 100 grams of a branched polyether with the OH number 263, made from about 4 mols of thiodiglycol, about 2 mols of trimethylol propane and about 1 mol of ethoxylated hydroquinone,

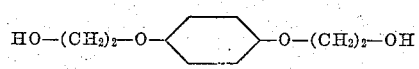

are mixed with about 2 grams of hexahydrodimethyl aniline, about 2 grams of emulsifier and about 2 grams of Turkey red oil. After adding about 10 grams of siliceous chalk, about 5.4 grams of water and about 54 grams of a toluylene diisocyanate isomer mixture (see Example 7), and after stirring, a rigid foam is obtained which shows the following values:

Bulk weight _____ 91 kg./m.³.
Compressive strength _____ 3.28 kg./m.³.
Saponification number _____ 58.

Example 11

About 366 parts of thiodiglycol are condensed according to Example 3 with about 177 parts of hexanediol and about 134 parts of trimethylol propane with addition of about 0.5% of p-toluene sulfonic acid methyl ester. The condensation is stopped at an OH number of 298. The polyether is a very viscous light yellow water-insoluble substance which is soluble in the conventional lacquer solvents.

About 50 parts of acetic ester are now added to about 100 parts of this polythioether and about 125 parts of about a 75% solution of an addition product of about 3 mols of toluylene diisocyanate with about 1 mol of trimethylol propane are added thereto by stirring. The NCO number of this 75% solution in acetic ester is 18.

This solution is applied in a dilute layer to wood, glass or metal. The film dries thereon in a completely non-tacky manner after about three hours and has excellent properties with respect to saponifying influences.

Example 12

About 244 parts of thiodiglycol are condensed as described in Example 3 with about 608 parts of 4,4'-di-(β-hydroxyethyl)-ether of 4,4-dihydroxy-diphenyl-dimethyl methane of the formula

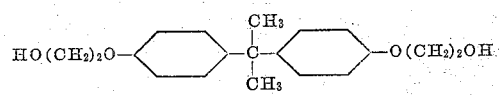

with addition of about 0.2% of p-toluene sulfonic acid ethyl ester. Water is split off at about 130° C. When the OH number has reached 110, the product is so viscous that it can no longer be stirred. In the cold state, it is a spring-hard resin.

About 25 parts of acetic ester and about 25 parts of cyclohexanone are mixed by stirring with about 100 parts of this polythioether. For cross-linking purposes, there are then added about 46 parts of the triisocyanate referred to in Example 11, with the NCO number of 18. After being applied to wood or metal, the product solidifies in about 2 hours to form a completely insoluble film which is very resistant to scratching and saponification.

Example 13

2240 parts of thiodiglycol are heated to 180 to 190° C. in the presence of 0.3% o-phosphoric acid until 350 parts of water have been split off. By further condensation in water jet vacuum an OH number of 50 is reached. The resulting polyether constitutes a wax-like brownish mass which melts at about 50° C.

300 parts of this polyether are mixed by stirring at about 120° C. with about 192 parts of 4.4'-diphenyl-methane-diisocyanate. The temperature rises to 142° C. After cooling to 95° C. 50 parts of 1.4-butylene glycol and 1.5 parts of N-methyldiethanol amine are added to the reaction mixture which is then poured into waxed molds heated to 100° C. The rubber-like molding can be removed after about 10 minutes. It shows the following mechanical properties after further heating for 24 hours:

Tensile strength _____ 213 kg./cm.².
Breaking elongation _____ 460%.
Permanent elongation _____ 38%.
Loading at 20% elongation _____ 8 kg./cm.².
Loading at 300% elongation _____ 164 kg./cm.².
Elasticity _____ 54%.
Shore hardness _____ 94.

Example 14

About 1220 grams (about 10 mols) of bis-β-hydroxyethyl sulfide are mixed with about 3.7 grams of hexahydrodimethyl aniline and about 880 grams (about 20 mols) of ethylene oxide are introduced at about 120–140° C. The brownish colored product thus obtained has an OH number of about 542 (calculated 536).

About 2100 grams of this product are condensed in the presence of about 15 grams of p-toluene sulfonic acid with about 1220 grams of bis-β-hydroxyethyl sulfide at about 150–170° C. while introducing nitrogen. After the main quantity of water has been split off, the condensation is completed by applying a water jet vacuum. The product obtained after a condensation period of about 6 hours (about 2½ hours under vacuum) has an hydroxyl number of about 77. It is a yellowish brown viscous oil which is completely insoluble in water. The yield is about 91% of the theoretical.

The polythioether thus obtained is reacted at 100° C. with 640 parts of hexamethylene diisocyanate. After the reaction has been completed the product is further heated for 30 minutes at 120° C. The creamy reaction product which is useful as an adhesive is filled into tubes. If the adhesive is applied to a leather surface the leather can be laminated with a second leather sheet, with polyurethanes or textiles in the cold. The laminate exhibits outstanding strength.

Example 15

About 1220 grams of thiodiglycol and about 1780 grams of 1.4-butylene-bis-hydroxyethyl glycol which has been prepared from 1.4-butylene glycol by hydroxyethlation at about 120–130° C., in the presence of a small proportion of sodium, until the theoretical increase in weight is attained are heated while stirring in a carbon dioxide atmosphere after the addition of about 12 grams of p-toluene sulfonic acid monohydrate. A reaction in which water is violently split off is initiated at a temperature of about 150–160° C. After about 6 hours, a water-jet vacuum is applied and the condensation is continued at about 160° C. until an OH content of about 5.48% is reached. A yellowish-brown oil is obtained in a yield of about 97% of the theoretical, this oil being insoluble in water. No formation of tetrahydrofuran is observed during the condensation.

1000 parts of the polythioether thus obtained are thoroughly freed from water and mixed with 20 parts of triethanol amine. Thereafter, 200 parts by weight of toluylene diisocyanate are dropped into the reaction mixture at a temperature of 90–100° C. which temperature is held for a further hour. A viscous oil is obtained having an OH number of 56.1.

100 parts of the reaction product are homogeneously mixed by stirring with 3 parts of bis-(N-diethylethanol amine)-adipate, 2 parts of diethyl amino oleate and 2 parts of water. About 31 parts of toluylene diisocyanate are added to this mixture and thoroughly mixed by means of a high speed stirrer. A highly elastic foam is formed which is cured after a short time and which is very resistant to saponifying influences.

Example 16

300 parts of a polythioether with an OH number of about 50 prepared in analogy to Example 15 are reacted at 120° C. with 120 parts of diphenylmethane diisocyanate. After reaction has been completed 27 parts of 1.4-butylene glycol are added to the reaction mixture which is then cast in waxed molds heated to 100° C. After further heating for 24 hours a highly elastic molding is obtained with high resistance to chemicals and oils.

Example 17

In the same way as described in Example 14, about 440 grams of ethylene oxide are introduced into about 1220 grams of bis-β-hydroxyethyl sulfide. A hydroxyethylation product is obtained which substantially consists of a product of the formula $$HO(CH_2)_2O(CH_2)_2S(CH_2)_2OH$$

By the addition of about 0.3% of p-toluene sulfonic acid and heating to about 150–170° C., this product is converted into a polythioether with the OH number of about 56, which is a yellowish brown viscous oil which is completely insoluble in water but is satisfactorily soluble in most organic solvents. The yield is about 97% of the theoretical.

300 parts of the resulting polythioether are reacted at 120° C. with 51 parts of 1.5-naphthylene diisocyanate. When reaction is completed 6 parts of 1.4-butylene glycol are stirred into the reaction mixture which is then cast into waxed molds heated to 100° C. After heating the mold for further 24 hours a highly elastic molding is obtained.

As indicated in the foregoing, the polyurethane plastics formed from the reaction of a polythioether glycol of a molecular weight above 500 may be cellular or homogeneous and may be used for making lacquers, films, sponges, tires, upholstery units and various articles of commerce.

Although the invention has been described in considerable detail in the foregoing in order to properly illustrate the invention, it is to be understood that the purpose of such detail is solely to illustrate the embodiments of the invention and that modifications can be made by those skilled in the art without departing from the spirit or scope of the invention except as is set forth in the claims.

What is claimed is:

1. A polyurethane casting obtained by a process which comprises reacting an excess of an organic polyisocyanate in a first step with a polythioether having terminal hydroxyl groups and having a molecular weight within the range of from about 800 to about 10,000, said polythioether having been formed by self-condensation of a monomeric thioether glycol having its hydroxyl groups in the beta position with respect to a sulfur ether atom to a temperature within the range of from about 100° C. to about 300° C., and thereafter mixing the resulting liquid product with a polyhydric alcohol containing 2 to 3 hydroxyl groups, pouring the resulting liquid mixture into a mold, and curing the liquid at a temperature of about 110° C. for at least about 24 hours until a completely cured solid polyurethane is formed.

2. The polyurethane casting of claim 1 wherein said monomeric thioether glycol is thiodiglycol.

3. A method of making a polyurethane casting which comprises reacting an excess of an organic polyisocyanate in a first step with a polythioether having terminal hydroxyl groups and having a molecular weight within the range of from about 800 to about 10,000, said polythioether having been formed by self-condensation of a monomeric thioether glycol having its hydroxyl groups in the beta position with respect to a sulfur ether atom to a temperature within the range of from about 100° C. to about 300° C., and thereafter mixing the resulting liquid product with a polyhydric alcohol containing 2 to 3 hydroxyl groups, pouring the resulting liquid mixture into a mold, and curing the liquid at a temperature of about 110° C. for at least about 24 hours until a completely cured solid polyurethane is formed.

References Cited in the file of this patent

UNITED STATES PATENTS

| | | |
|---|---|---|
| 2,518,245 | Morris et al. | Aug. 8, 1950 |
| 2,563,383 | Vaughan et al. | Aug. 7, 1951 |
| 2,692,873 | Langerak et al. | Oct. 26, 1954 |
| 2,692,874 | Langerak | Oct. 26, 1954 |
| 2,726,219 | Hill | Dec. 6, 1955 |
| 2,764,565 | Hoppe et al. | Sept. 25, 1956 |
| 2,780,350 | Simon et al. | Feb. 5, 1957 |
| 2,835,654 | Carter et al. | May 20, 1958 |
| 2,850,464 | Mitchell | Sept. 2, 1958 |
| 2,871,227 | Walter | Jan. 27, 1959 |
| 2,900,368 | Stilmar | Aug. 18, 1959 |
| 2,929,800 | Hill | Mar. 22, 1960 |